Nov. 23, 1943.   R. B. HINES ET AL   2,334,926
MEASURING APPARATUS
Filed March 21, 1940   2 Sheets-Sheet 1

Inventors
ROBERT B. HINES and
CLARENCE JOHNSON
By Raymond D. Jenkins
Attorney

Patented Nov. 23, 1943

2,334,926

UNITED STATES PATENT OFFICE 2,334,926

MEASURING APPARATUS

Robert B. Hines, East Cleveland, and Clarence Johnson, Cleveland Heights, Ohio, assignors to Bailey Meter Company, a corporation of Delaware Application March 21, 1940, Serial No. 325,218

6 Claims. (Cl. 219—38)

Our invention relates to a method and apparatus for analyzing gaseous mixtures to quantitatively determine the percentage therein of one of the constituent gases. It is particularly directed to the determination of the percentage of free oxygen in the combustion gases exhausting from internal combustion engines, or leaving furnaces of various types.

The invention finds more particular application in that type of gas analyzers in which the gas to be analyzed is mixed with the fuel and passed in contact with a catalytic wire forming one leg of a Wheatstone bridge wherein the catalytic wire acts to assist in burning the free oxygen of the gaseous sample, and at the same time the catalyst wire is used to measure the temperature change due to the combustion of the free oxygen in the gas which comes into contact with the wire. The change in temperature of the catalytic wire, due to combustion thereon, acts to change the resistance of the wire to current flow. The catalytic wire is mounted in, and forms a part of, a galvanometer circuit so that the change of resistance to the flow of electrical current through the wire due to its temperature change provides a voltage in the galvanometer circuit to measure the temperature change, and thus to measure the percentage of free oxygen in the flowing sample.

This general type of gas analyzer is old and well known, both for determining the percentage of free oxygen or the percentage of combustible constituents in such a gaseous sample. Furthermore, it is known that various types of fuels may be used in such a method and apparatus for uniting with and consuming the free oxygen of the sample. Of such fuels hydrogen is an example of a gaseous fuel, while methanol is an example of a liquid fuel.

There are many advantages to be attained through the use of a liquid fuel, of which methanol is used herein as an example, including the ease of handling and storage, the small space required both interiorly and externally of the analyzer mechanism per se. When it is appreciated that a given volume of such a liquid fuel will occupy approximately seventeen hundred times that volume in its gaseous form at or near atmospheric pressure, it will be understood that a relatively small volume of such a liquid fuel will keep such an analyzer in continuous operation for a period of weeks or months without replenishment. In actual operation and servicing of equipment this has a decided advantage.

In order that such an analyzing method and apparatus be consistent, sensitive, and accurate, it is necessary that the gaseous samples to be analyzed and the fuel supplied for the burning of a constituent thereof, be continuously proportioned within close limits. One difficulty that has been experienced in the past in the use of liquid fuels is the constant and uniform vaporization of such a fuel, the control of its temperature, pressure, rate of flow, etc., so that the resulting vapor fuel supplied to be mixed with the flowing gas sample is at a uniform rate and at uniform conditions of temperature, pressure, etc.

It is a particular object of our invention to so control the vaporization of a liquid fuel, such for example as methanol, that these and other difficulties are overcome and that the resulting gaseous or vapor fuel be supplied in predetermined proportion continuously to the flow of sample gas which is to be analyzed.

In our method and apparatus we speak generally of a "fuel generator," by which we mean that apparatus necessary to convert a liquid fuel into its gaseous or vapor form and to supply it to the chamber wherein it is mixed with the gaseous sample under proper conditions of flow, etc.

These and other objects will become apparent by reference to the following description and drawings, where:

Figures 1, 3:
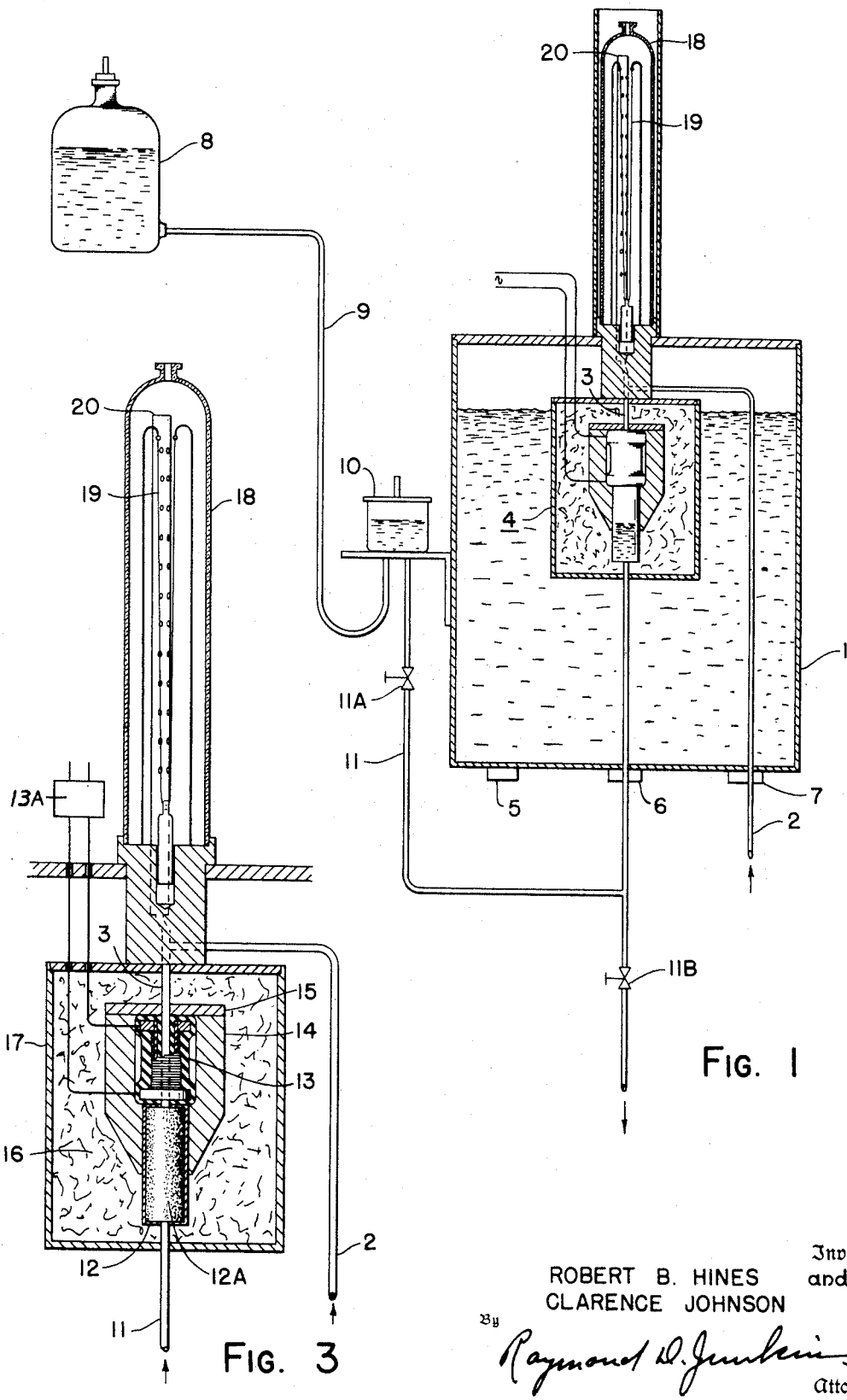
Fig. 1 is a diagrammatic view of an apparatus embodying our improved fuel generator.
Fig. 3 is an enlarged sectional detail of a part of Fig. 1.

Referring now to Fig. 1, we show therein a container 1 substantially filled with water or with a low vapor pressure fluid such as dibutyl phthalate and which fluid is desirably maintained at a substantially uniform temperature by means of electrical heaters 5, 6, 7 which may be thermostatically controlled and which may be located exteriorly of or internally of the container 1. A principle purpose of the uniformly heated liquid within the container 1 is to obviate any effect of ambient temperature changes upon the fuel vapor generator, and furthermore to assure that the vapor fuel and the gaseous sample are brought to a uniform temperature before they are mixed.

It will be seen, however, that the invention is by no means limited to the type of fluid used in the container 1, nor to the means for maintaining a substantially uniform temperature condition therein. The expedients for maintaining such a liquid at uniform temperature are well known and many variations may be employed. It is only desirable in connection with our invention that some predetermined substantially uniform temperature be maintained in the container 1 so that the gas sample supply and the vapor fuel supply will arrive at the mixing chamber or mixing point at the same temperature condition.

Referring to Fig. 1, a measured sample of gas to be analyzed flows into the container 1 through a pipe 2. The means for maintaining a uniform flow of the gas to be analyzed is not a part of our present invention, and it is therefore not deemed necessary to show any of the common and well known means in detail.

A supply of liquid fuel, such as methanol, is available in an external container 8 which feeds through a pipe 9 to a float level control 10, which may be of the simple float arrangement employed in an ordinary automobile carburetor. From the float chamber 10 the liquid fuel passes through a shutoff valve 11A, a pipe 11, and to the vaporizer element of the vapor generator 4. A valve 11B is provided for draining the system.

The preferred fuel vapor generator 4 is shown in more detail in Fig. 3. The pipe 11, bringing the liquid fuel to the generator 4, preferably passes for some distance through the liquid of the container 1 to bring the liquid fuel to a uniform temperature at its entrance to the generator 4. The liquid fuel passes to a small elongated cylinder 12 wherein a level is maintained by the level mechanism 10. The cylinder 12 preferably contains a porous wick 12A of ceramic or stone material capable of readily and completely absorbing the liquid fuel and presenting a large area for evaporation to the predetermined depth. An exit pipe for the fuel gas or vapor is provided at 3 and is encircled by a heating element 13 adapted to maintain a uniform or constant heat input. The heating element is of a commercially available type having a resistance wire imbedded in a ceramic cylinder which encircles the exit pipe 3 for a portion of its length. The cylinder 12 and the heating element 13 are in turn enclosed in a metallic cylinder 14 of considerable thickness and conically tapering from the heating element to the liquid container 12. The taper of the cylinder 14 may be steep or gradual as desired and it may or may not entirely cover the cylinder 12. The cylinder 14 is capped by a circular cover 15, thus entirely enclosing the heating resistance 13 with heat conducting metal.

The parts 12, 13, 14 and 15 compose the generator proper, which is preferably lagged by some suitable insulation material 16, contained in a casing 17, within the liquid of the container 1.

In operation a substantially constant depth of liquid fuel is maintained in the cylinder 12, thus partially submerging the porous ceramic wick 12A. The wick material 12A may be of any desirable material, but is preferably of porous stone or ceramic material, as we have found this to be preferable over any fabric or similar material. While we speak of a level being maintained within the cylinder 12, substantially the same as that maintained within the float chamber 10, it is to be understood that the wick material 12A will become more or less completely saturated, thus presenting a tremendous area for vaporization of the liquid.

We maintain a constant input of heat to the generator 4 by means of the heating element 13 through a uniform power input, and this may be accomplished by a constant wattage, voltage, or current control if desired. While primarily the exit conduit 3 is heated by the heater 13, yet the principal purpose of the metal encasement 14 is to absorb and transmit heat from the heater 13 to the cylinder 12 to cause vaporization therein of the liquid fuel. The amount and extent of such heat transmittal depends to a considerable degree upon the shaping of the encasing cylinder 14, its taper, and the extent of encirclement by it of the cylinder 12. Through the use of a porous ceramic wick we avoid presentation of varying evaporating areas, such as have been found unsatisfactory in open or surface type evaporation. We further avoid difficulties such as bubbling, vapor tension effects, capillary surfaces, etc. The porous stone wick is preferable over a cloth or fabric wick which frequently develops an alternating cycle of saturation, evaporation, etc.; as well as eventual clogging and hardening of the cloth or other fibres.

A further feature of the preferred location of the heater 13, and its transmittal encasement 14, is not only to furnish heat for vaporizing the liquid fuel from the porous stone wick 12A, but to prevent condensation of such vapor as it flows upwardly through the exit pipe 3. Furthermore, the design of the heater 13 and its encasement 14 may be arranged to superheat the fuel vapor to varying degree as it flows through the conduit 3 if this is desired. It will be apparent then that we have provided a fuel generator of a uniform capacity output, that is only dependent upon the heat applied, and one that is independent of all variables except rate of heat input and rate of heat loss. These variables are substantially eliminated by providing a constant power input control 13A for the heater 13 and by minimizing or maintaining constant the heat loss through the lagging 16 and the constant temperature bath within the container 1.

The resultant fuel vapor passes through the conduit 3 toward an outlet of substantially atmospheric pressure, under a slight pressure resultant from the change in volume of the fuel from a liquid to a vapor or gaseous state resulting from vaporization. Passing from the conduit 3 the vapor fuel meets the flowing gas sample in a T-connection of the pipes 2 and 3 above the generator 4, the mixture then flowing upwardly into a detector chamber 18 where it is evenly distributed over an adjacent suspended catalyst wire 19 by means of a diffusing tube 20 having a multitude of small holes substantially parallel to the length of the catalyst wire. If there is any free oxygen in the flowing gas sample the mixture of free oxygen and fuel vapor burns on the catalyst wire resulting in a change of temperature with corresponding change in electrical resistance of the wire. As previously mentioned, the catalyst wire comprises one leg of a Wheatstone bridge circuit so that any change in resistance of the leg will be indicative of the free oxygen content in the flowing gas sample to be analyzed.

Figure 2:
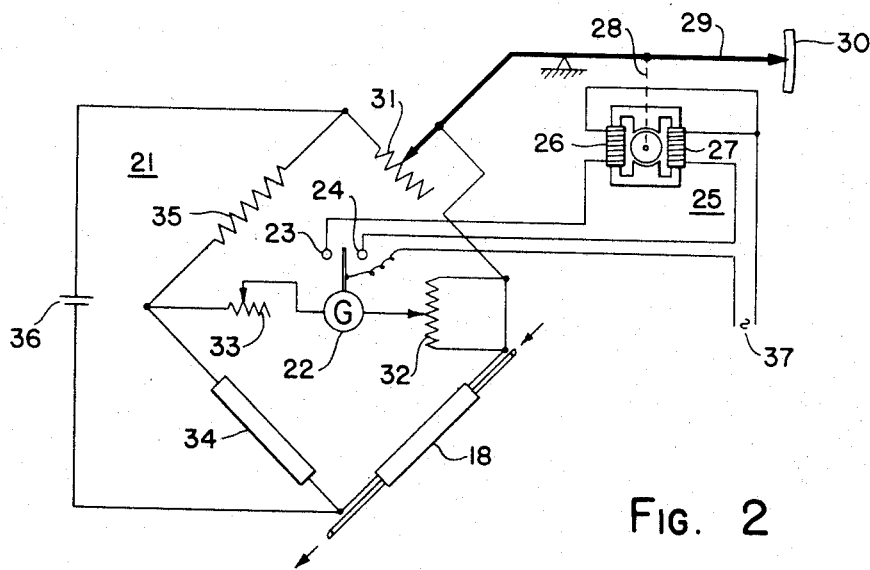
Fig. 2 is a schematic electric circuit including the analyzer of Fig. 1.

In Fig. 2 we show schematically the bridge circuit of which the catalyst wire 19 is a part. The catalyst container 18 is shown as placed in one leg of the bridge and the variations in the resistance of the catalyst 19 are compared to a somewhat similar resistance contained in a comparison cell 34. Resistances 31 and 35 comprise the remaining legs of the bridge, the resistance 31 being a balancing leg having a movable contact positioned by a balancing motor 25 which also, through the linkage 28, positions a pointer 29 relative to an index 30. The index 30 is preferably graduated to read directly in percentage of free oxygen in the sample gas being analyzed. The bridge is supplied with a source of power 36 and has across conjugate corners a galvanometer 22 adapted upon deviation from its neutral position to engage either the contact 23 or the contact 24 controlling respectively the energization of the motor winding 26 or the motor winding 27. Thus if the galvanometer 22 deviates from balanced position in one direction or the other the motor 25 will be energized to rotate in proper direction, whereby the resistance value 31 is varied to rebalance the bridge and at the same time the pointer 29 is moved relative to the index 30 to show the percentage of free oxygen in the flowing gas sample. Resistances 32 and 33 are provided for calibrating the system.

Figures 4, 5:
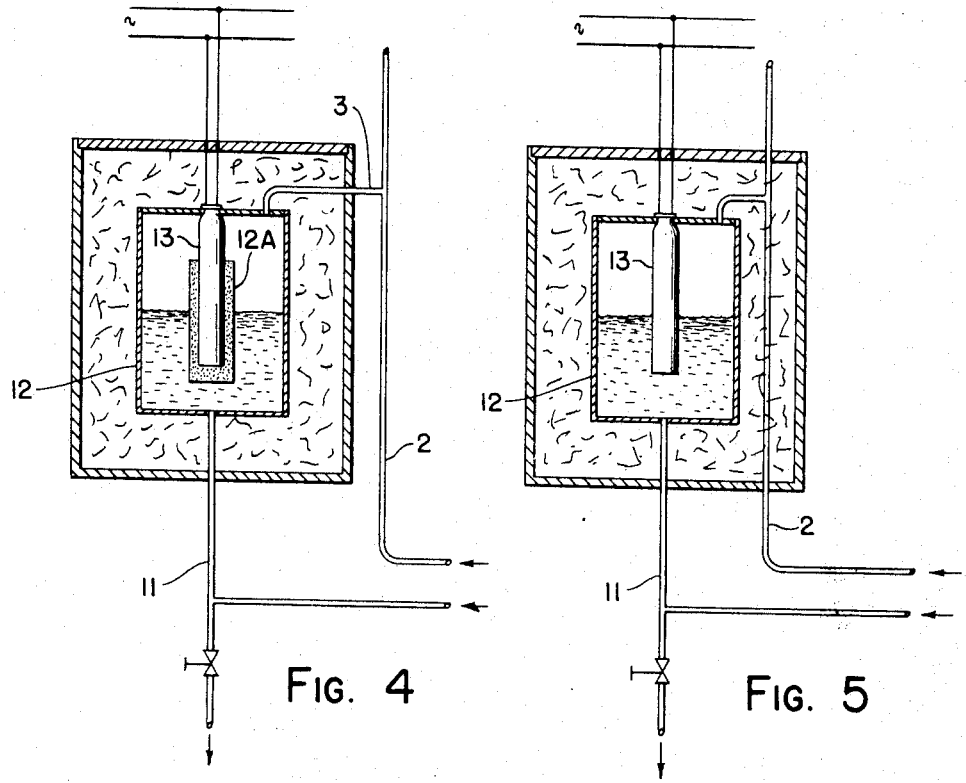
Figs. 4 and 5 represent further modifications of our invention.

While we have illustrated and described a preferred arrangement of our fuel vapor generator in Figs. 1 and 3, we illustrate modifications thereof in Figs. 4 and 5. In Fig. 4, for example, we show an arrangement wherein the constant heat output heater 13 is in part at least surrounded or encased by the ceramic or porous wick 12A. The heater 13 and wick 12A are positioned in a cylinder 12 in which liquid fuel is maintained at a substantially predetermined level by means of the level control 10, although here again it is expected that the porous material 12A will be substantially saturated with liquid fuel, and that therefore the level of liquid within the container 12 is not important so long as it does not fall below contact with the wick member 12A. In Fig. 4, as in Figs. 1 and 3, the cylinder 12 is lagged by any suitable material.

In Fig. 5 we represent a further simplified modification in which the heater element 13 is positioned in part at least directly in the liquid body of the container 12.

It will be understood, referring particularly to Fig. 3, that the basic rate of fuel vapor generation depends upon the heat output of the heater 13 for any given design, arrangement, or size of the elements 12A and 14. To maintain constant the heat output of the heater 13 it is only necessary to maintain constant the electrical power of the heater, and this may be done in any of the well known ways. For example it may be accomplished by constant voltage control, constant current control, constant wattage control, etc. It is a part of our contemplation that resistance or other means may be provided in the way of an external controller whereby the basic rate of heat output of the heater 13 may be varied to establish and maintain different rates of vapor generation. For example, electrical control means may be provided whereby the rate of fuel vapor generation and/or its final temperature may be changed as to standard and thereafter maintained constant at the predetermined standard.

It is to be observed that the pipes 2, 3 and 11 are not capillaries in nature, but may be of a reasonable size such that they will not become clogged or affected by slight dirt particles or in other ways.

While by no means necessarily limited thereby, we desire to point out below certain decided advantages which our preferred arrangement of a fuel vapor generator has over previously known types.

1. The rate of vapor generation is controlled by the rate of heat input, i. e., constant electrical power input.

2. The supply of fuel vapor is constant or steady and not subject to pulsations or variations in rate.

3. The vapor generator is small and compact and may be located vertically, longitudinally, or as desired.

4. A large and unvarying evaporating area of liquid is provided to the application of heat.

5. The preferred wick member is not subject to the well known variations and troubles of cloth or similar materials.

6. The resultant fuel vapor may be superheated or controlled as to temperature basically by design and thereafter by change of control standard and by maintenance of the standard value.

7. The generator will not get into a pulsation or hunting cycle which in past arrangements has resulted from flooding, boiling, etc.

8. It is not necessary to have an extremely accurate level control of the liquid nor an extremely accurate temperature control of the entire unit.

9. The detrimental effects of ambient temperature variations is minimized.

10. Even though the boiling point of the liquid fuel in cylinder 12 may vary slightly over a long period of time, due to contamination by impurities left upon evaporation; the rate of evaporation will be unaffected.

While we have illustrated and described certain preferred embodiments of our invention it will be understood that we are not limited to these exact arrangements.

What we claim as new, and desire to secure by Letters Patent of the United States is:

1. A vapor fuel generator for a gas analyzer comprising in combination, means for supplying liquid fuel to the generator at the exact rate at which it is vaporized, a porous member to which the liquid is supplied and from which it is vaporized, a conduit for conducting vapor from the member, a heater member in heat transferring relation to said conduit, and means to maintain the output of said heater constant.

2. A vapor fuel generator for a gas analyzer comprising in combination, means for supplying liquid fuel to the generator, a porous stone member to which the liquid is supplied, a conduit for conducting vapor away from said member, a heater element closely adjacent both the porous stone member and the conduit, and heat conducting means for proportioning the application of heat from said heater between said porous stone member and said conduit.

3. A vapor fuel generator for a gas analyzer comprising in combination, a container to which liquid fuel is supplied, a porous stone member substantially filling said container, a conduit for leading vapor away from the container, a heater element surrounding the conduit adjacent the container, and a heat conducting member surrounding the heater element and a portion of the container.

4. A vapor fuel generator for a gas analyzer comprising in combination, a container to which liquid fuel is supplied, a porous stone member in the container providing relatively large evaporating surface for the liquid, a heater element adjacent the container, and a heat conducting member surrounding the heater element and at least a portion of the container, the heat conducting member being shaped with a portion of progressively varying cross-sectional area arranged to provide a predetermined variation of application of heat to different portions of the surface of the container.

5. A vapor fuel generator for a gas analyzer comprising in combination, a container to which liquid fuel is supplied, a porous stone member providing a relatively large evaporating surface for the liquid and substantially filling said container, a conduit for leading vapor away from the container, a heater element surrounding the conduit adjacent the container, and a heat conducting member surrounding the heater element and at least a portion of the container, the heat conducting member having a portion of progressively varying cross-sectional area diminishing toward the container to provide a predetermined variation of application of heat.

6. A vapor fuel generator for a gas analyzer comprising in combination, means for supplying liquid fuel to the generator at a constant rate, a relatively large evaporating surface to which the liquid is supplied, an electric heater closely adjacent said surface for accelerating evaporation, and constant electric power input control means connected to said heater whereby fuel vapor generation rate is maintained in desired degree and uniformity.

ROBERT B. HINES.
CLARENCE JOHNSON.